Feb. 23, 1971  P. ENGELER  3,565,585
CONVERTING MACHINE FOR COMPOST
Filed Oct. 31, 1968  7 Sheets-Sheet 1

INVENTOR.
PAUL ENGELER
BY
McGlew & Toren
ATTORNEYS

Feb. 23, 1971  P. ENGELER  3,565,585
CONVERTING MACHINE FOR COMPOST
Filed Oct. 31, 1968  7 Sheets-Sheet 2

INVENTOR.
PAUL ENGELER
BY
McGlew & Toren
ATTORNEYS

Feb. 23, 1971 P. ENGELER 3,565,585
CONVERTING MACHINE FOR COMPOST
Filed Oct. 31, 1968 7 Sheets-Sheet 3

INVENTOR.
PAUL ENGELER
BY
McGlew & Toren
ATTORNEYS

Feb. 23, 1971  P. ENGELER  3,565,585
CONVERTING MACHINE FOR COMPOST
Filed Oct. 31, 1968  7 Sheets-Sheet 5

INVENTOR.
PAUL ENGELER
BY

ATTORNEYS

Feb. 23, 1971 P. ENGELER 3,565,585
CONVERTING MACHINE FOR COMPOST
Filed Oct. 31, 1968 7 Sheets-Sheet 6

INVENTOR.
PAUL ENGELER
BY
*Nelder & Toren*
ATTORNEYS

Feb. 23, 1971        P. ENGELER        3,565,585

CONVERTING MACHINE FOR COMPOST

Filed Oct. 31, 1968        7 Sheets-Sheet 7

INVENTOR.
PAUL ENGELER

BY

McGlew & Toren
ATTORNEYS

United States Patent Office 3,565,585
Patented Feb. 23, 1971

3,565,585
CONVERTING MACHINE FOR COMPOST
Paul Engeler, 5 Am Steinkreuz, 4401 Saerbeck,
Westphalia, Germany
Filed Oct. 31, 1968, Ser. No. 772,249
Int. Cl. C05f 11/06
U.S. Cl. 23—259.1    14 Claims

ABSTRACT OF THE DISCLOSURE

A converting machine for compost is arranged to be moved longitudinally in the loading-unloading direction and also in the transverse direction. At the forward end of the machine a conveyor, having prongs or tooth-like members extending perpendicularly from its surface, conveys material in an upwardly sloping direction to the upper end of a discharge passage. Means are provided for mixing air and water into the compost material prior to its delivery into the discharge passage. The discharge passage contains means for regulating the manner in which the material is discharged from the machine.

SUMMARY OF THE INVENTION

The present invention is directed to a converting machine for use with compost, such as is used in cultivating mushrooms, and, more particularly, to a novel arrangement of such a machine for attaining improved efficiency.

Converting machines for compost have been known in the past, such as the one disclosed in German Pat. No. 1,189,778, issued Mar. 25, 1965. The machines employed in the past have been characterized by a conveyor mounted on an undercarriage and incorporating means for picking up the compost onto the conveyor and delivering it into a discharge passage arranged for limiting the manner in which the compost is stacked. In such a machine a roller having spike-like members extending from its circumferential periphery is arranged to cooperate with the conveyor in the transfer of the compost to the discharge passage. Generally, in such machines the conveyor has been arranged to form a 55 to 65° angle with the plane in which the machine is supported.

It is the primary object of the present invention to provide an improved converting machine construction for affording more effective operation and increased efficiency.

Moreover, another object of the invention is to improve the ripening process of the compost in its passage through the machine.

Another object of the invention is to improve the manner in which the machine is moved forwardly and transversely.

Still another object of the invention is to arrange the discharge passage from the machine so that the manner of stacking or loading the compost material from the machine can be easily and effectively regulated and controlled.

Therefore, in accordance with the present invention, a converting machine for compost is provided with a support frame extending in the longitudinal direction, that is, the direction of movement of the machine during the compost pick-up or loading operation. At the forward end of the machine an upwardly sloping conveyor is provided with tooth-like or prong-type members mounted on its surface for picking up the material and holding it on the conveyor as it is transported upwardly. The conveyor extends rearwardly and passes the compost material into the upper end of a discharge passage. At the upper end of the conveyor, before the compost material enters the discharge passage, means are positioned to add air and water to the material. Further, at the upper end of the conveyor a roller is arranged with means for cooperating with the tooth-like members on the conveyor for transferring the compost material from the conveyor into the discharge passage.

As the compost material enters the discharge passage, a deflecting rake and deflecting plate are provided for regulating the direction of the flow of the material into the discharge passage. Moreover, the walls forming the discharge passage are movably mounted for varying the area of the discharge passage and, if desired, for providing it with a funnel-like configuration. Alternatively, the compost material may be discharged from the lower end of the discharge passage or it may be directed onto conveyors for moving it transversely of or rearwardly from the machine.

Wall means are incorporated with the support frame to provide a chamber separated from the remainder of the machine and containing the motor for driving the conveyor and the means for moving the machine in the longitudinal and transverse directions.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
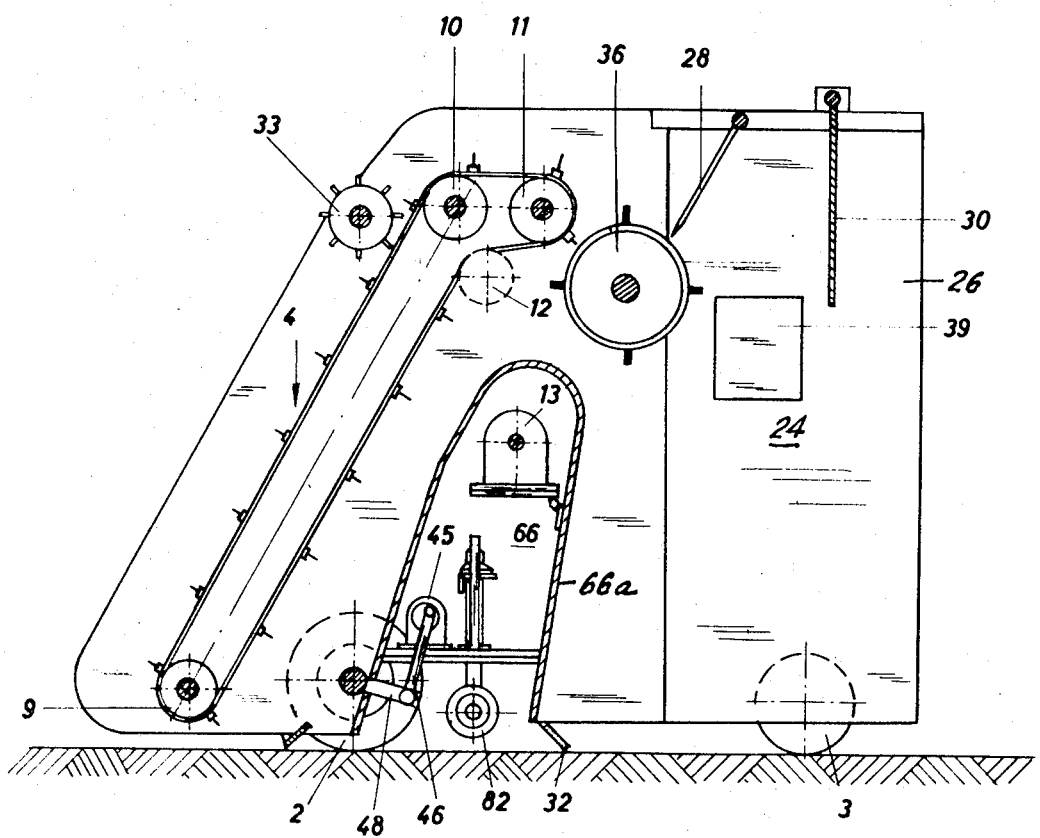
FIG. 1 is a schematic longitudinal sectional view of a converting machine embodying the present invention.
Figure 2:
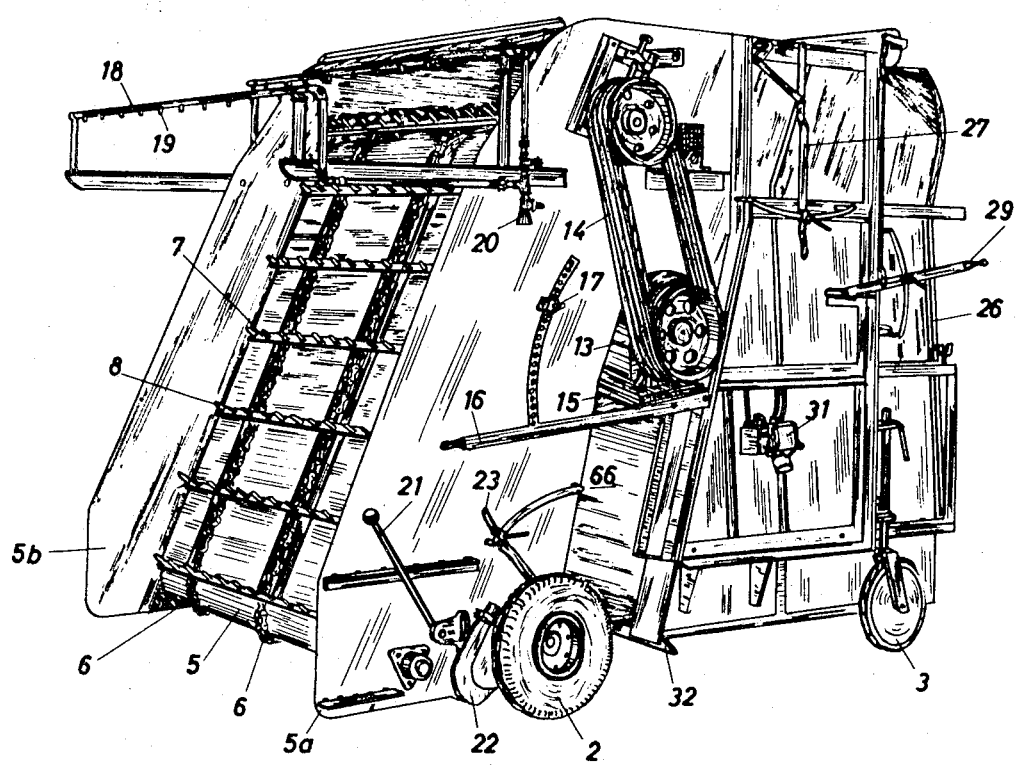
FIG. 2 is a perspective view of a converting machine embodying the present invention and having a somewhat different arrangement as compared to FIG. 1.
Figure 10:
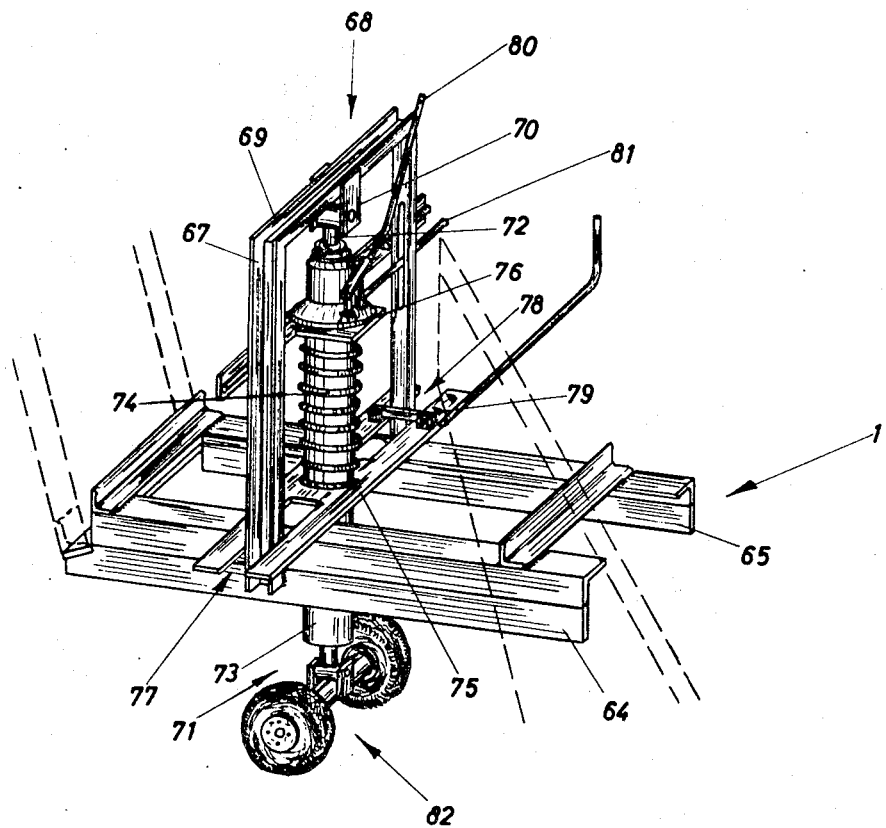
FIG. 10 is a perspective view illustrating a device arranged for transversely displacing the converting machine.

In the drawings, the converting machine is mounted upon a longitudinally extending support frame 1, as best illustrated in FIG. 10, which extends in the normal direction of travel of the machine. In FIGS. 1 and 2 the position of the front and rear wheels 2 and 3 are indicated, the front wheels 2 being the driving wheels of the machine, see FIG. 5. In FIG. 1 a schematic illustration is set forth of the conveyor having prong or tooth-like members extending perpendicularly from its surface.

Figure 3:
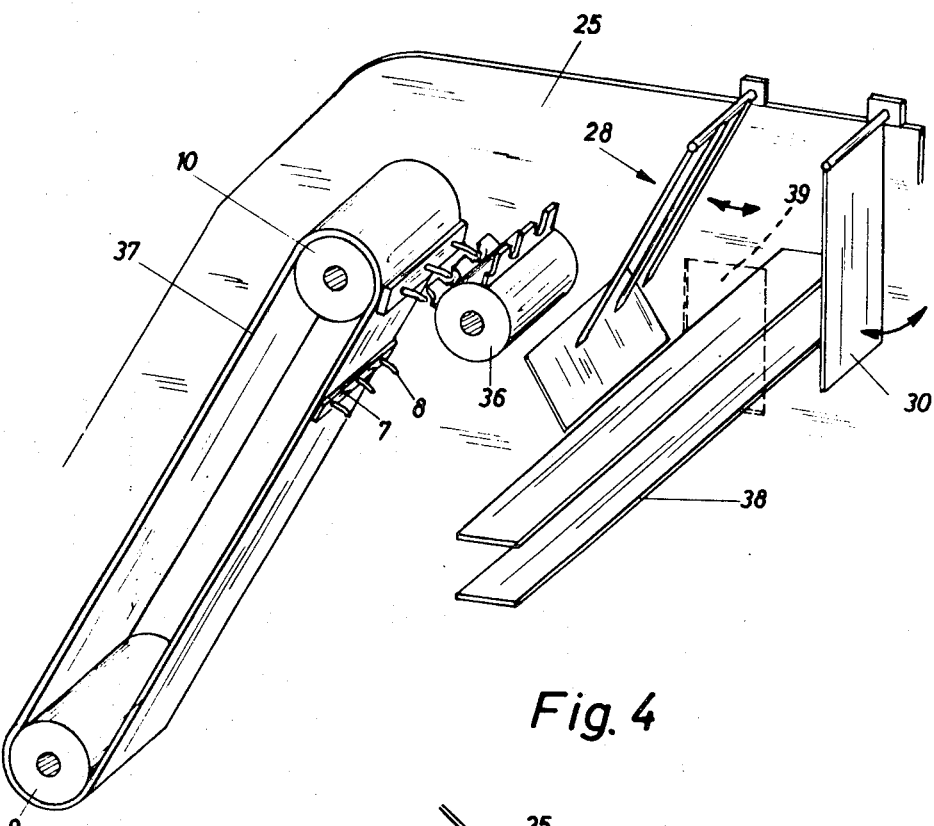
FIG. 3 is a schematic side view in perspective of a portion of a converting machine embodying the present invention, but having a conveyor construction different from that shown in FIG. 1.

In FIGS. 2 and 3, two different forms of a conveyor 4 are shown, in FIG. 2, the conveyor is formed by a plurality of link chains 6 while in FIG. 3 a conveyor belt 37 is employed. The conveyor arrangement in FIG. 2 is formed of a bottom plate and two or three chain links which extend over the plate traveling over at least one upper and lower roller. Extending transversely across the conveyor 4 at longitudinally spaced locations are beams or support members 7 to which individual prongs or tooth-like members 8 are secured, extending perpendicularly from the conveyor surface. The chains 6 travel over two or three deflecting rollers 9, 10 and 11, see the alternative arrangements shown in FIGS. 1 and 3, and one or more pressure rollers 12 may be employed but they are not a necessary element of the conveyor arrangement.

Mounted on the frame 1 is a U-shaped wall member 66a which extends transversely of the normal loading direction of the machine and forms a compartment or chamber 66 separated from the remainder of the machine to prevent the material being conveyed from entering into the chamber. Mounted in the chamber 66 is an electrically driven motor 13 connected by V-belts to the roller 10 which acts as the driving roller for the conveyor. It will be appreciated that means other than V-belts may be employed for powering the driving roller. The motor 13 is supported on a bracket 15 which, in turn, can be positioned by means of a lever 16 for regulating the tension of the V-belt 14 in a simple manner. Moreover, a locking device 17 is mounted on the side of the machine, see FIG. 2, for holding the lever 16 in position after the proper tension has been applied to the belt.

At the front end of the machine the conveyor is positioned between a pair of spaced side walls 5a and 5b. Moreover, the conveyor is set rearwardly of the forward edges of the side walls 5a, 5b for facilitating the pick up of the compost material by the tooth-like or prong members extending from the surface of the conveyor. The side walls and the conveyor form a trough-like passageway.

At the upper ends of the side walls, spaced outwardly from the conveyor 4, is an arrangement of water conduits 18 and nozzles 19 for spraying the material traveling upwardly on the conveyor. The water conduit 18 is connected to a source of water by a connector 20 located on one side of the machine. As an alternative to the nozzles 19 shower heads or other spray devices may be incorporated with the water conduit for effectively wetting the compost material as it is transported on the conveyor.

At the lower portion on the outside surface of the side wall 5a, a lever 21 is positioned for shifting the bottom clearance plate 22. Another lever 23 is positioned rearwardly of the lever 21 for regulating the speed of the machine as will be described subsequently with respect to the arrangement of the apparatus for driving the machine shown in FIG. 5.

Located rearwardly of the conveyor and extending substantially vertically is a discharge passage 24, see FIG. 1, formed between the side walls 25 and 26. Within the upper end of the discharge passage 24 a deflecting rake 28 and a deflecting plate 30 are positioned rearwardly of the upper end of the conveyor 4. Mounted on the exterior of the side wall 26 is a lever 27, see FIG. 2, which serves to rotate the deflecting rake about a horizontal axis to the desired position within the discharge passage. Additionally, another lever 29 is mounted on the side wall 26 below the lever 27 for positioning the deflecting plate about a horizontal axis within the discharge passage. Below these levers an electrical connector 31 is provided for connection to a source of electric current for driving the motor 13 and also for driving the motor 45 located within the chamber 66 which is used in driving the machine.

In FIG. 2 the wheels 3 are shown mounted on the side walls of the discharge passage in such a manner that they are adjustable in height, as is known in similar agricultural machines.

At the bottom of the discharge passage along its leading edge, that is, in the direction of the conveyor, a bottom plate 32 is positioned sloping rearwardly which prevents the compost passing downwardly through the passage from falling forwardly below the chamber 66.

Figure 7:
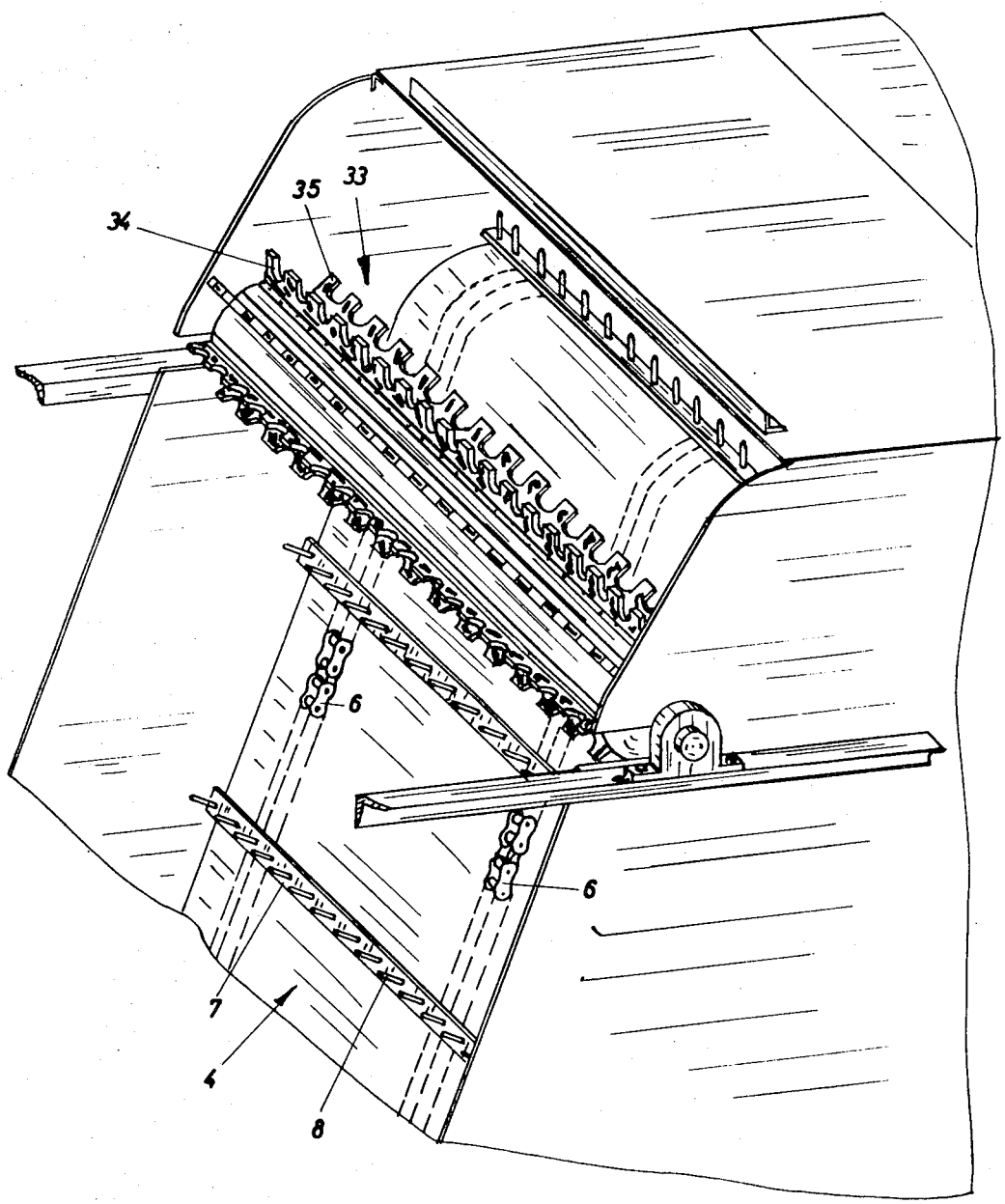
FIG. 7 is a perspective view illustrating a part of the upper end of the conveyor and a roller, as shown in FIG. 1, for stripping the conveyor of the compost material.

Near the upper end of the conveyor 4 adjacent its upwardly passing surface is a stripping roller 33, as shown in FIGS. 1 and 7. Extending transversely across the stripping roller 33 are a plurality of outwardly projecting bands 34 formed of an elastic material and shaped to provide stripping members 35 shaped to pass between the corresponding tooth-like members on the conveyor. As shown in FIG. 1 there are eight bands 34 extending across the roller. However, there may be a smaller number, such as four located uniformly about the surface of the roller. The action of the stripping members 35 cooperating with the tooth-like members 8 on the conveyor assist in loosening the compost prior to its delivery into the upper end of the discharge passage.

In FIG. 3 an alternative arrangement of the conveyor 4 is shown in which a belt 37 passes over the rollers 9 and 10 and has supporting beams 7 positioned transversely on the surface of the belt with the tooth-like members 8 extending perpendicularly outwardly from the belt in the same manner as on the link chain 6 exhibited in FIGS. 2 and 7.

Figure 6:
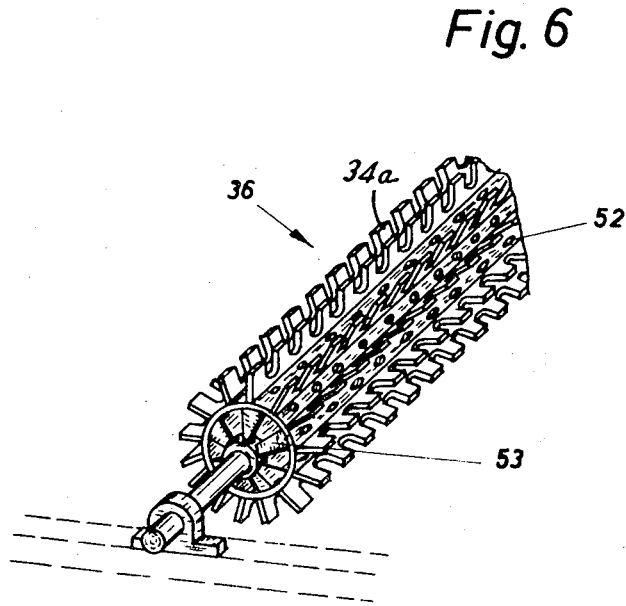
FIG. 6 is a perspective view of a portion of a roller member arranged to supply air into the compost material.

While the stripping roller 33 is positioned adjacent the conveyor 4 before it reaches the end of its upward travel, the roller 36 is positioned rearwardly of the conveyor for receiving the material from the conveyor and directing it into the upper end of the discharge passage 24. In FIG. 6 a preferred arrangement of the roller 36 is shown in which a hollow shell forms the roller and has a plurality of bands 34a similar to those on the stripping roller 33 extending across the exterior surface. Disposed between the bands and extending through the shell are a plurality of holes 52 for supplying air into the compost being directed into the discharge passage. At the end of the hollow shell a number of fan blades 53 are positioned for sucking air into the interior of the roller and for forcing the air out through the holes into the compost.

As shown in FIG. 1, at its lower end the deflecting rake 28 is located closely from the roller 36 directly in the path of the compost coming from the conveyor. As explained previously both the deflecting rake and the deflecting plate, positioned rearwardly of the rake, are arranged to be pivoted by levers 27 and 29, respectively, about horizontal axes for movement in the direction of the arrows shown in FIG. 3. By properly positioning the rake 28 and the plate 30 the desired angle or direction of flow of the compost into the discharge passage can be regulated. The adjustment of the angle of flow of the material into the discharge passage is necessary in determining the height of the material as it is stacked at the lower end of the discharge passage or for regulating the flow of material if it is being deposited on a conveyor means 38 instead of passing to the bottom of the passage 24.

The conveyor belt 38, see FIG. 3, extends through an opening in the side wall 25 of the discharge passage 24 for conveying compost material in a direction transverse to the loading direction of the machine. In normal operation the opening 39, which may be located in either of the side walls 25 or 26, is closed. However, when it is desired to load the compost material from the discharge passage in a transverse direction the opening 39 is used for inserting the transverse conveyor belt and the compost material is directed onto the belt by means of the rake 28 and the plate 30 for avoiding the material dropping from the belt downwardly through the passage.

In FIG. 3, it will be noted that the conveyor belt 37 passes over a lower roller 9 and an upper roller 10 and does not use the additional deflecting roller 11 shown in FIG. 1. In this arrangement, the material as it passes off the conveyor at the roller 10 is picked up by the rollers 36 and deposited into the upper end of the passage 24.

Figure 4:
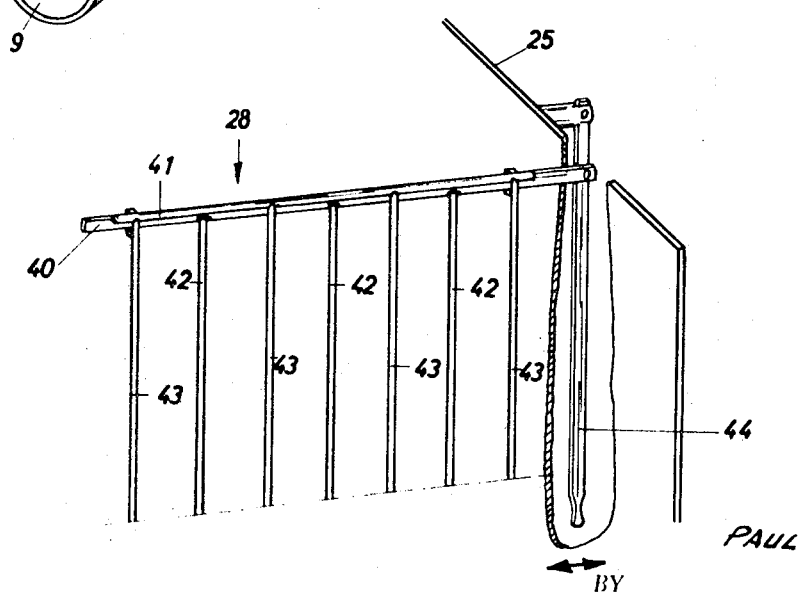
FIG. 4 is a partial view of a deflecting rake.

In addition to being rotatably positionable, the deflecting rake 28 is formed of two supporting bars 40, 41 which are connected in such a way as to be movable with respect to one another. One of the supporting bars 40 is equipped with the rake tines 42 while the other supporting bar 41 is provided with rake tines 43. As mentioned previously, the lever 27 adjusts the vertical alignment of the rake within the passage by swinging it about its horizontal axis, similarly lever 44, see FIG. 4, is arranged to adjust the horizontal distances between the rake tines of the supporting bars 40, 41. By moving the lever 44 in the direction of the arrow shown at the lower portion of FIG. 4 the supporting bars 40, 41 are moved relatively to one another and the tines are adjustably positioned as required for loading the compost material into the discharge passage.

Figure 5:
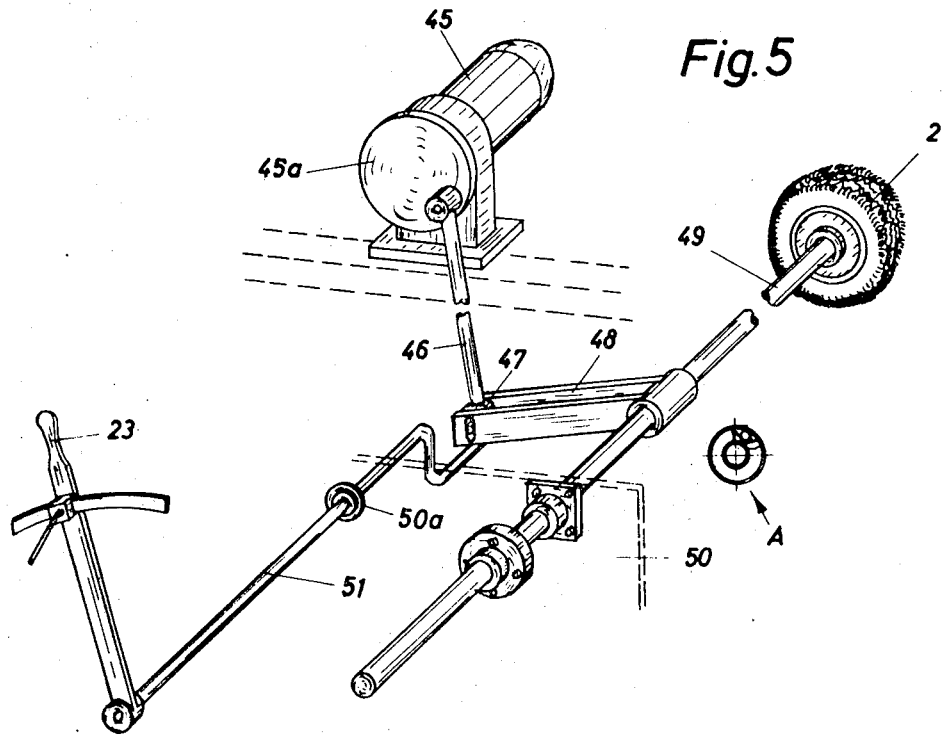
FIG. 5 is a perspective view illustrating the drive means for the arrangement shown in FIG. 1.

The movement of the converting machine in the loading direction, that is, the leftward direction as shown in FIGS. 1 and 2, is effected by means of an electromotor 45 positioned within the chamber 66. In FIG. 5, the connection between the electromotor 45 and the drive wheels 2 is shown. An eccentric disk 45a is mounted on the motor 45 and a bar 46 is secured near the edge of the eccentric disk and extends downwardly in its longitudinal direction and is guided within a slider 47. At the lower end of the bar 46 a stop is provided so that as it moves upwardly the stop contacts the slider and lifts it upwardly. The slider 47 is fixed within a fork shaped member 48 which is connected at its opposite end over a free running drive A which is shown in detail by the representation indicated by the arrow leading from A, with the drive shaft 49 mounted within the drive A for driving the wheels 2. This free running drive A has the effect that when the disk rotates and the bar moves in the upward direction the wheel 2 and its drive shaft is set into rotation. However, when the bar moves downwardly the driving action is discontinued and the machine is advanced in an intermittent fashion. On the partition 50, shown in dotted lines in FIG. 5, an eccentric shaft 51 is secured by a connector 50a and the lever 23 at the end of the shaft 51 is arranged to position the member 48 so that the length of the stroke of the member 48 can be regulated.

Figure 8:
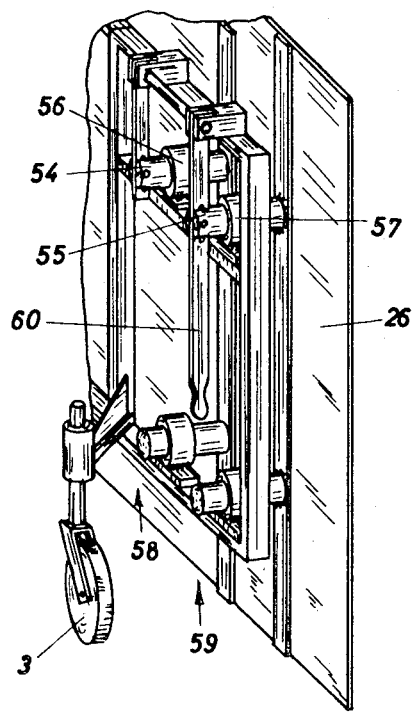
FIG. 8 is a perspective view of a portion of one of the walls forming the discharge passage.

For regulating the manner in which the compost material is discharged from the discharge passage 24 the side walls 25, 26, defining the sides of the discharge passage, can be moved in parallel relationship to one another or, alternatively, they can be pivoted about a horizontal axis intermediate their ends. In pivoting the side walls 25 and 26, they can be arranged in either converging or diverging relationship top to bottom providing a funnel-like passage. In FIG. 2, for purposes of clarity, the means for positioning the side walls have not been illustrated, however, in FIG. 8 the means for moving the side walls are shown in detail. In FIG. 8, a pair of shafts or pins 54, 55 are secured to the upper portion of the side wall 26 and extend laterally outwardly from the wall and are fitted, in sliding relationship, within bushings 56, 57. A similar arrangement of pins and bushings 58 and 59 is provided at the lower portion of the wall with the bushings being supported in a frame structure. Above the bushngs 56, 57 a lever 60 is indicated for displacing the upper portion of the wall inwardly or outwardly by moving the pins 54, 55 through the bushings 56, 57. Though not shown in FIG. 8, a similar lever is provided for the bushings at the lower part of the wall for providing a similar movement. The levers are arranged to be locked in position to secure the wall sections in proper location. By manipulating the levers in the same manner, the side wall 26 can be moved in a vertical plane inwardly or outwardly relative to the opposite side wall 25. However, if it is desired to provide a converging or diverging relationship for the side walls, one of the levers can be left locked while the other one is manipulated for moving the upper or lower portion of the wall inwardly or outwardly as desired.

Figure 9:
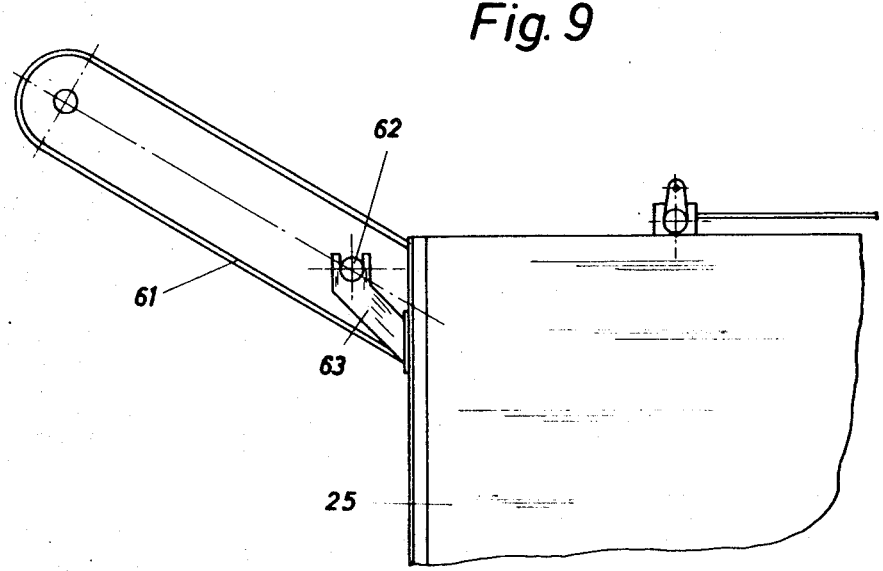
FIG. 9 is a side view illustrating an alternative arrangement of a conveyor belt for transporting the compost material from the discharge passage.

In FIG. 3, the conveyor belt 38 was indicated passing through the discharge passage in the transverse direction. In FIG. 9, a conveyor belt 61 is illustrated mounted for movement in the rearward direction from the discharge passage to permit discharge of the compost material from the rear of the machine. In this arrangement, the conveyor belt 61 is provided with laterally extending pins 62 which are fitted into and supported within fork-shaped members 63 secured to the side walls, such as shown in FIG. 9 with the forked shaped member 63 attached to the side wall 25. The conveyor belt 61 is removably supported on the members 63 and can be positioned on or removed from the discharge passage as required in operation of the machine.

To permit transverse displacement of the machine or to return the machine after movement by the free running drive A shown in FIG. 5, the apparatus illustrated in FIG. 10 is employed. In this apparatus, the frame 1 of the machine is comprised of a pair of longitudinally extending support beams 64, 65. Within the chamber 66 of the machine, a vertically extending frame 68 is secured at its lower ends to the supporting beams 64, 65. The frame 68 is formed by upwardly extending U-shaped struts 67 which form an upper cross strut 69 extending in the horizontal direction through the chamber 66. Aligned below the upper cross strut 69 is a piston-cylinder unit 71 comprised of a piston rod 72 adjacent the upper cross strut 69 and a cylinder 73 extending downwardly from the piston rod. At its upper end the piston rod 72 is articulated to the upper cross strut 69 by a connector 70. Extending transversely between the supporting beams 64, 65 is a bridge member 75 and the cylinder 73 extends downwardly through an opening in the bridge member. A coil spring 74 is wrapped about the cylinder 73 and bears against the bridge 75 at its lower end and against a flanged stop 76 located at the upper end of the cylinder. At each end of the bridge 75 a transversely extending recess 77, 78 is provided which fits about the upright struts 67 of the frame 68 in sliding relationship. The struts 67 are guided within the recesses 77, 78 and, in addition, the cylinder is movably positionable through the opening in the bridge which is situated between the recesses. While the cylinder is movably positionable through the bridge the coil spring 74 is anchored between the bridge and the flanged stop 76. A stop 79 is secured to the bridge for locking it against transverse movement relative to the frames 1 and 68.

Hydraulic pressure is produced within the cylinder 73 by a pump, not shown, by means of a pump lever 80 mounted on the upper end of the cylinder. Further, another lever 81 is mounted on the cylinder for actuating a valve, not shown, which releases the pressure operating within the cylinder. When hydraulic pressure is applied by means of the pump lever 80 the piston rod 72 is extended from the cylinder 73 and the frame 68 which is rigidly connected to the frame 1 is thus lifted. However, running gear 82 of the transverse displacement apparatus is secured to the lower end of the cylinder 73 and continues to bear on the support surface of the machine. In this manner the entire machine including its driving wheels 2 are lifted from the ground and the machine can then be effectively moved transversely or rearwardly as desired. It is a prerequisite of this arrangement that the apparatus for transverse displacement, as shown in FIG. 10, be located in the center of the machine for proper balance.

If the stop 79 located on the bridge 75 is disengaged, the bridge member can be displaced relative to the frame 1 and the running gear 82 is similarly displaced. If the piston rod 72 is extended after positioning of the bridge 75 the machine can be displaced transversely of its longitudinal axis due to the sliding relationship of the bridge 75 relative to the frame 68 and the frame 1 of the machine.

From the foregoing explanation and description of the machine its manner of operation will be readily apparent. The compost material is picked up by the toothlike or prong members 8 on the conveyor 4 and transported upwardly and rearwardly to the upper end of the conveyor. At its upper end the compost material is stripped from the conveyor and water and air is mixed with the compost material before it is deposited by means of the roller 36 into the discharge passage 24. As explained above, the side walls 25 and 26 of the discharge passage 24 can be selectively positioned for regulating the manner in which the compost material is stacked at its lower end. Similarly, conveyor belts 38, see FIG. 3, or conveyor belt 61, see FIG. 9, can be positioned within the discharge passage 24 to receive the compost material from the rollers 36 for discharge on the belts in either a transverse or a rearward direction. Within the discharge passage the deflecting rake 28 and the deflecting plate 30 are movably positionable for regulating the manner in which the material is discharged either downwardly through the passage or onto the conveyors. As can be appreciated the embodiments illustrated in the drawings and described herein do not limit the inventive concept and additional modifications can be utilized without departing from the basic idea of the invention.

What is claimed is:

1. A converting machine for compost material having a forward end and a rearward end and comprising means forming a support frame, a conveyor mounted in said support frame at the forward end of the machine and being arranged to transport material upwardly and rearwardly from the lower forward end of the conveyor in a plane disposed at an oblique angle to the horizontal, means being mounted on said conveyor for picking up compost material and for holding the material on said conveyor as it passes upwardly, means cooperating with said conveyor for removing the material from the upper end of said conveyor, said means for removing the material comprising a roller having its axis extending transversely of the direction of travel of said conveyor and being located rearwardly of and below the rearward end of said conveyor, and a plurality of members extending across said roller and being arranged to extend into cooperative relationship with said means on said conveyor for removing the compost material from said conveyor and depositing the compost material into the upper end of said discharge passage, means positioned on said support frame for forming a downwardly directed discharge passage arranged to receive the material from the upper end of said conveyor and for discharging the material from the rearward end of the machine, means located in said discharge passage adjacent and rearwardly of the upper end of said conveyor for regulating the discharge of material through said discharge passage, means for directing water into the material prior to its delivery into said discharge passage, means for supplying air into the material prior to its delivery into said discharge passage, said means for directing water into the compost material comprising a water supply pipe mounted on said frame adjacent and forwardly of the upper end of said conveyor, and a plurality of spray means secured to said pipe for directing water into the compost material at the upper end of said conveyor, and said means for supplying air into the compost material comprising said roller having a hollow shell and a plurality of transversely extending rows of holes extending through said shell between the location of attachment of said members to said roller, and blade means secured to the end of said roller within said hollow shell for drawing air into the interior of said roller and for forcing the air outwardly through the holes in said hollow shell for mixing with the compost material prior to its delivery into the discharge passage.

2. A converting machine, as set forth in claim 1, wherein a motor mounted with the machine for driving said conveyor comprising a plurality of spaced rollers with at least one of said rollers operatively connected to said motor for driving said conveyor, a pair of front wheels mounted on said frame near the forward end of the machine, a pair of rear wheels being mounted on the sides of said machine near the rear end thereof, drive means for driving said front wheels of said machine, wall means secured to said frame and extending transversely of the forward direction of travel of the machine at a point intermediate the forward and rearward ends thereof and forming an inverted U-shaped chamber in the lower end of said machine, and said drive means for said front wheels and said motor for driving said conveyor is located within said chamber.

3. A converting machine, as set forth in claim 1, wherein means are mounted on said frame for effecting transverse movement of said machine relative to the forward loading direction of the machine, said means for transverse movement of the machine comprising a vertically extending inverted U-shaped strut rigidly secured to said frame, a vertically positioned piston cylinder, a piston rod extending from the upper end of said piston cylinder and articulated at its upper end to the upper end of said inverted U-shaped strut, said piston cylinder extending downwardly from the upper end of said U-shaped strut, a pair of support wheels secured to the lower end of said cylinder and arranged for supporting the machine, a bridge member extending across the lower end of said U-shaped strut and having transversely extending recesses therein arranged in sliding interfitting relationship with the vertical sections of said U-shaped strut and having an opening therethrough located between said recesses through which said piston cylinder is movably positionable, a stop means on said bridge for securing said bridge in position relative to said U-shaped strut, a coil spring extending about said piston cylinder, a stop flange on said cylinder above said bridge, said coil spring extending between said stop flange and said bridge, and means for extending said piston rod from said piston cylinder whereby said U-shaped support and said frame of said machine are lifted upwardly as a unit while said wheels mounted on the lower end of said piston cylinder provide support for the machine and also afford movement thereof.

4. A converting machine, as set forth in claim 1, wherein a deflecting plate is mounted at the lower end of said discharge passage and slopes rearwardly toward the rear end of the machine for directing the flow of the compost material from the lower end of said discharge passage.

5. A converting machine, as set forth in claim 1, wherein a stripping device is supported on said frame forwardly of and adjacent the upper end of said conveyor, said stripping device comprising a roller having its axis extending transversely of the path of travel of said conveyor, and a plurality of stripping bands secured to and extending across and radially from the peripheral surface of said roller and being arranged to extend toward said conveyor, said stripping band is formed of an elastic material and is configured to intermesh with said means on said conveyor for cooperating therewith in removing the compost material from said conveyor at the end of its upward passage.

6. A converting machine, as set forth in claim 5, wherein the radially outer edges of said stripping bands are shaped to provide alternating tooth-like members and gaps whereby said means on said conveyor pass between the gaps formed between the tooth-like members on said stripping band for cooperating in the removal of the compost material from the said conveyor.

7. A converting machine, as set forth in claim 1, wherein said means forming a discharge passage comprising a pair of vertically extending laterally spaced side walls movably supported on said frame and extending in the direction of said conveyor, and means for laterally displacing said side walls in the horizontal direction for selectively adapting the interior configuration of said discharge passage for discharging the compost material from the machine.

8. A converting machine, as set forth in claim 7, wherein said means for movably supporting said side walls comprising at least one support member attached to the upper end of each of said side walls and at least one support member secured to the lower end of said side walls, bushings supported on said frame and adapted to receive said support members in sliding relationship, and means mounted on said frame and operatively connected to said bushings and support members for horizontally displacing said side walls inwardly and outwardly relative to one another whereby said side walls can be displaced in parallel realtionship to each other and in converging or diverging relationship in the vertical direction for selectively shaping the discharge passage.

9. A converting machine, as set forth in claim 7, wherein at least one of said side walls has an opening therethrough, a conveyor belt arranged to be positioned through the opening in said side wall for receiving compost material thereon and for discharging the compost material in a transverse direction to the loading direction of the machine.

10. A converting machine, as set forth in claim 7, wherein support members are secured to the rearward ends of said side walls, a conveyor belt removably supported in said support members and having the forward end thereof located within said discharge passage and extending rearwardly therefrom in the opposite direction from the forward end of said machine for receiving and discharging compost material from the machine.

11. A converting machine, as set forth in claim 1, wherein said means for regulating the discharge of materials through said discharge passage comprises a vertically arranged deflecting rake extending transversely across said discharge passage rearwardly from said conveyor and being located at the entrance into said discharge passage, said deflecting rake being movably positionable about a horizontal axis extending transversely across said discharge passage for positioning said deflecting rake and selectively determining the angular direction in which the compost material enters into the upper end of said discharge passage.

12. A converting machine, as set forth in claim 11, wherein said deflecting rake comprises a pair of horizontally arranged support members extending transversely across the upper end of said discharge passage, said support members being movably positionable relative to one another and a plurality of downwardly extending horizontally spaced rake tines attached to said support bars whereby the spacing between said tines can be varied by movably positioning said support members relative to one another.

13. A converting machine, as set forth in claim 2, wherein said drive means for driving said front wheels of said machine comprising a motor, an eccentric disk mounted on said motor, an arm secured to said disk near its edge and extending longitudinally therefrom, a drive shaft for said front wheels, a fork member mounted on said drive shaft and extending therefrom in a direction transverse to the axis of said drive shaft, said arm secured to said fork member at a position remote from said drive shaft, said fork member being arranged for imparting rotation to said drive shaft during the upward movement of said arm as said eccentric disk rotates and for discontinuing movement of said shaft during the downward movement of said arm whereby said drive shaft and front wheels are driven intermittently.

14. A converting machine, as set forth in claim 13, wherein an eccentric shaft member is secured to said fork member and extends transversely therefrom to the exterior of said frame of the machine, and a lever is secured to said eccentric shaft on the exterior of the machine for positioning said fork member and regulating the length of the stroke of the fork member in relationship to the movement of said arm.

References Cited

UNITED STATES PATENTS

| 2,679,114 | 5/1954 | Morrison | 23—259.1X |
| 2,994,591 | 8/1961 | Toto | 23—259.1 |

FOREIGN PATENTS 1,189,778  3/1965  Germany.

JAMES H. TAYMAN, JR., Primary Examiner

U.S. Cl. X.R.

23—259.3; 34—83; 47—1.1; 56—345; 71—5, 8